United States Patent
Conete et al.

(10) Patent No.: US 12,195,406 B2
(45) Date of Patent: Jan. 14, 2025

(54) CMC MATERIALS WITH INTEGRATED THERMOCOUPLE

(71) Applicants: SAFRAN CERAMICS, Le Haillan (FR); SAFRAN, Paris (FR)

(72) Inventors: Eric Conete, Moissy-Cramayel (FR); Lisa Pin, Moissy-Cramayel (FR); Ioannis Stasinopoulos, Moissy-Cramayel (FR)

(73) Assignees: SAFRAN CERAMICS, Le Haillan (FR); SAFRAN, Paris (FR)

( * ) Notice: Subject to any disclaimer, the term of this patent is extended or adjusted under 35 U.S.C. 154(b) by 0 days.

(21) Appl. No.: 18/722,026

(22) PCT Filed: Dec. 13, 2022

(86) PCT No.: PCT/FR2022/052321
§ 371 (c)(1),
(2) Date: Jun. 20, 2024

(87) PCT Pub. No.: WO2023/118687
PCT Pub. Date: Jun. 29, 2023

(65) Prior Publication Data
US 2024/0417339 A1 Dec. 19, 2024

(30) Foreign Application Priority Data
Dec. 22, 2021 (FR) .................................. 2114232

(51) Int. Cl.
*C04B 41/52* (2006.01)
*C04B 41/00* (2006.01)
(Continued)

(52) U.S. Cl.
CPC .......... *C04B 41/52* (2013.01); *C04B 41/0072* (2013.01); *C04B 41/009* (2013.01);
(Continued)

(58) Field of Classification Search
CPC ..... F01D 5/282; F01D 5/284; C04B 41/0072; C04B 41/009; C04B 41/5024; C04B 41/5111
See application file for complete search history.

(56) References Cited

U.S. PATENT DOCUMENTS

| 10,690,551 B2 * | 6/2020 | Gregory ............. G01K 7/08 |
| 2004/0202886 A1 * | 10/2004 | Subramanian ........... G01N 3/56 427/596 |
| 2017/0234739 A1 | 8/2017 | Gregory et al. |

OTHER PUBLICATIONS

Written Opinion of the International Searching Authority as issued in International Patent Application No. PCT/FR2022/052321, dated Mar. 30, 2023.
(Continued)

*Primary Examiner* — Michael L Sehn
(74) *Attorney, Agent, or Firm* — Pillsbury Winthrop Shaw Pittman LLP

(57) ABSTRACT

A part includes a substrate made of ceramic matrix composite material, the substrate being coated with a multilayer stack including at least, and in this order, starting from the substrate a tie layer including silicon; an insulation layer including a rare earth disilicate or silica; a barrier layer including a rare earth disilicate; the part further including at least one thermocouple inserted between the insulation layer and the barrier layer.

10 Claims, 2 Drawing Sheets

(51) Int. Cl.
    *C04B 41/45* (2006.01)
    *C04B 41/50* (2006.01)
    *C04B 41/51* (2006.01)
    *F01D 5/28* (2006.01)
    *F01D 21/00* (2006.01)

(52) U.S. Cl.
    CPC ...... *C04B 41/4562* (2013.01); *C04B 41/5024* (2013.01); *C04B 41/5111* (2013.01); *F01D 5/284* (2013.01); *F01D 5/288* (2013.01); *F01D 21/003* (2013.01); *F05D 2230/31* (2013.01); *F05D 2300/15* (2013.01); *F05D 2300/21* (2013.01); *F05D 2300/6033* (2013.01); *F05D 2300/611* (2013.01)

(56) References Cited

OTHER PUBLICATIONS

Rivera, K., et al., "Diffusion barrier coatings for CMC thermocouples," Surface and Coatings Technology, vol. 336, Sep. 2017, pp. 17-21.
Wrbanek, J. D., et al., "Ceramic thin film thermocouples for SiC-based ceramic matrix composites," Thin Solid Films, Elsevier, vol. 520, No. 17, Apr. 2012, pp. 5801-5806.
International Search Report as issued in International Patent Application No. PCT/FR2022/052321, dated Mar. 30, 2023.

\* cited by examiner

[Fig. 1]
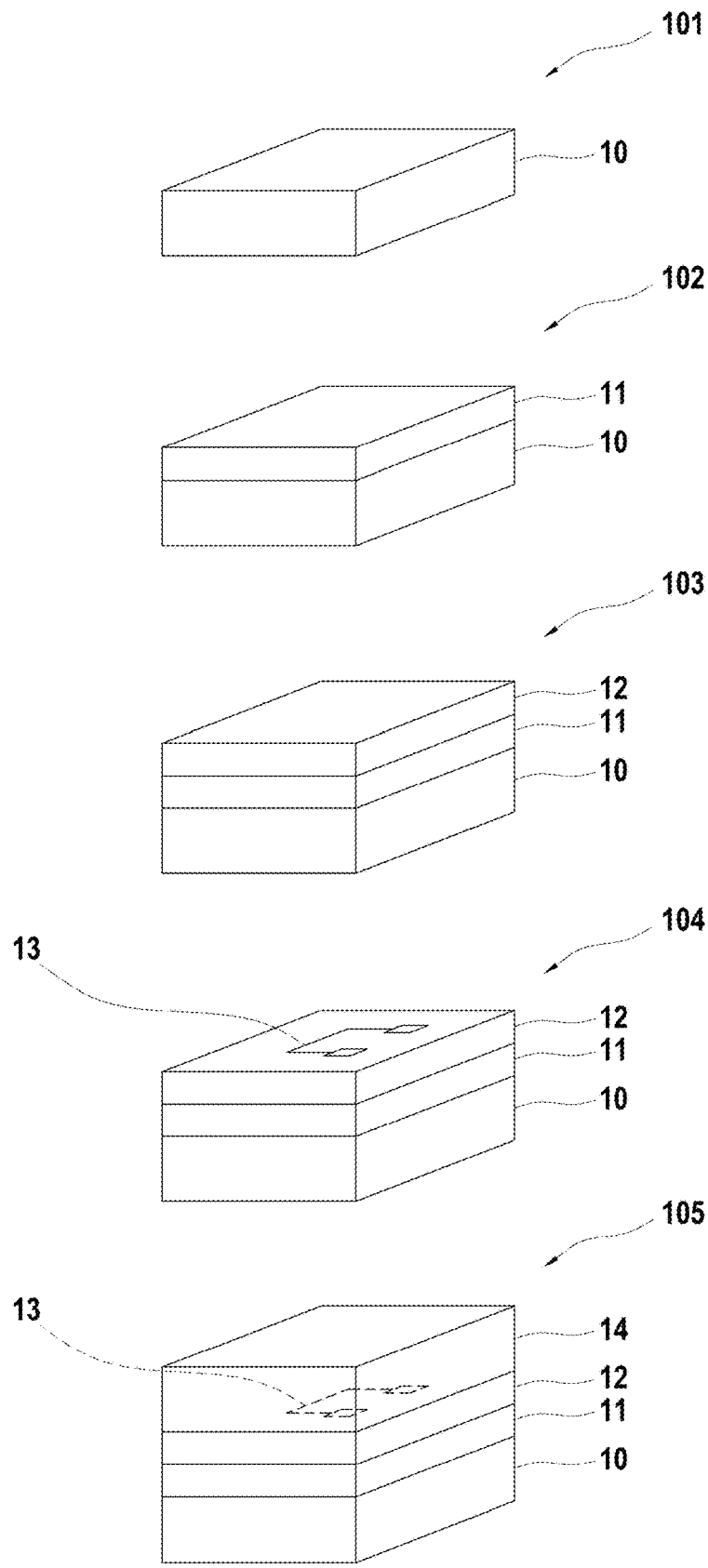

[Fig. 2]
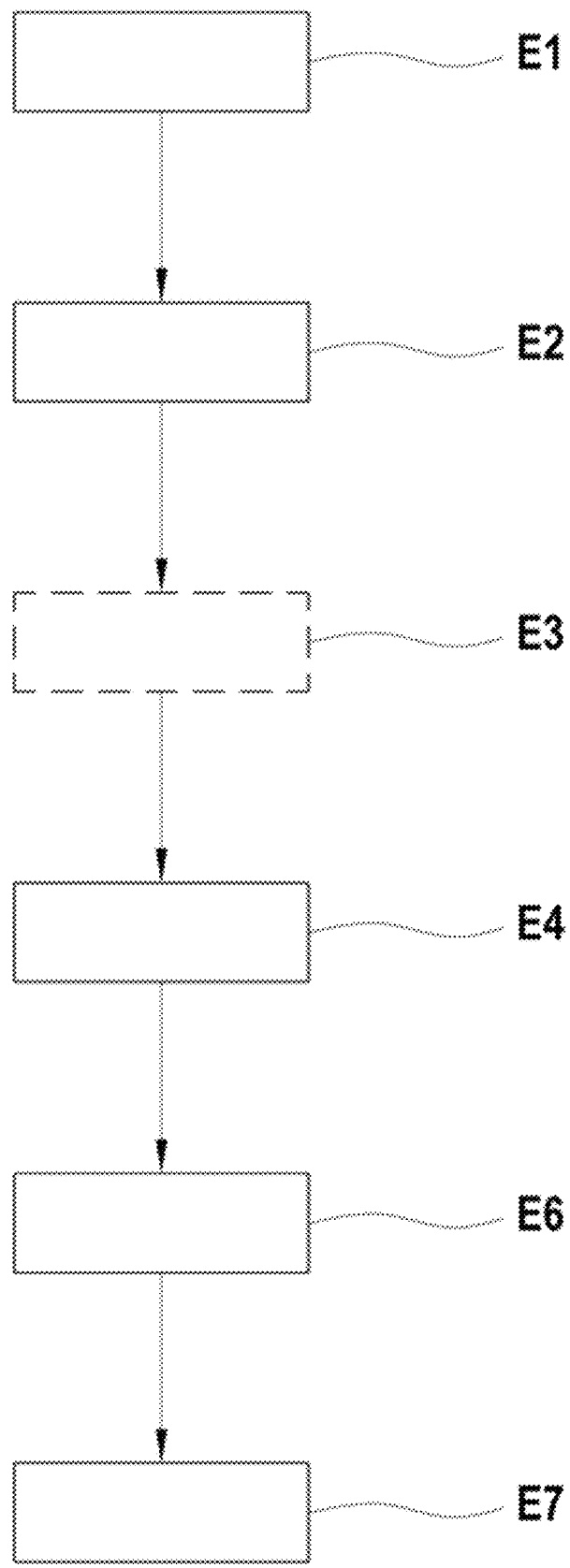

CMC MATERIALS WITH INTEGRATED THERMOCOUPLE

CROSS-REFERENCE TO RELATED APPLICATIONS

This application is the U.S. National Stage of PCT/FR2022/052321, filed Dec. 13, 2022, which in turn claims priority to French patent application number 21 14232 filed Dec. 22, 2021. The content of these applications are incorporated herein by reference in their entireties.

TECHNICAL FIELD

The invention relates to the field of ceramic matrix composite (CMC) materials and more precisely to that of coatings which can be applied to such materials and the study of the thermal behaviour of coated CMC parts.

PRIOR ART

CMC materials have good mechanical properties making them suitable for forming structural elements for aeronautical turbines, and they advantageously maintain these properties at high temperatures.

These CMC materials can however degrade when they are used at high temperatures and in a corrosive environment, as is the case when they are present in aeronautical turbines. It is normal, for such applications, to coat the composite material parts with a ceramic matrix of a barrier layer, which can act as a thermal barrier and/or environmental barrier.

The interface between the CMC substrate and the barrier layer is a location where damage can be initiated, in particular due to the difference in nature between the substrate and the barrier layer. This damage may originate from the difference in thermal behaviour of the substrate and the barrier, for example, and this is why it is important to know precisely the temperature at the interface between the substrate and the barrier layer.

For example, measurement of this temperature during characterisation tests can make it possible to precisely identify the temperature at which the substrate starts to degrade and to better understand the damage mechanisms.

In addition, knowing precisely the temperature close to the substrate makes it possible to quantify the thermal gradient obtained due to the barrier layer. It is thus possible to quantify the performance of the barrier layer.

It may also be desired to measure the temperature during normal or accidental operation of the CMC material part, in order to precisely determine the temperature to which it is exposed and to be able to predict its damage and that of its coating In order to precisely measure the temperature between the barrier layer and the substrate, it is generally proposed to use a thermocouple positioned close to the interface between the barrier and the substrate.

For example, the prior art includes a thermocouple that can be positioned above a thermal barrier or between a thermal barrier and a substrate. In this second embodiment, it is nevertheless necessary to encapsulate the thermocouple in an electrically insulating ceramic of a different composition from that of the thermal barrier layer in order to avoid interactions between the thermocouple and the layers.

Such an embodiment makes the thermocouple forming step and the method for forming the barrier layer on the substrate as a whole complex, compared with a part from the prior art.

There therefore remains an interest in coated CMC parts which allow precise determination of the temperature between the substrate and a barrier layer, and which would be free from the disadvantages of the solutions proposed in the prior art, as well as simplified methods for preparing such parts.

DISCLOSURE OF THE INVENTION

In order to respond to this need, the invention proposes a part comprising a substrate made of ceramic matrix composite material, said substrate being coated with a multilayer stack comprising at least, and in this order, starting from the substrate:
- a tie layer comprising silicon;
- an insulation layer comprising a rare earth disilicate or silica;
- a barrier layer comprising a rare earth disilicate;
- the part further comprising at least one thermocouple inserted between the insulation layer and the barrier layer.

In such a part, the insulation layer enables the interaction between the thermocouple and the silicon contained in the tie layer to be avoided. More specifically, the metals or alloys generally used for thermocouples measuring temperatures of interest for aeronautical turbomachine parts made of coated ceramic matrix composite material are not compatible with the presence of silicon, because they generally comprise platinum which can diffuse into the silicon and harm its good properties. Avoiding any contact between the thermocouple and the silicon can increase the lifespan of the thermocouple, of a part and of the tie layer, thus of the coating as a whole.

In addition, the thermocouple is thus very close to the tie layer, such that the temperature that it measures is as representative as possible of the temperature actually experienced between the substrate and the barrier layer. Moreover, such a part is more easily produced than a part of the prior art, since it is not necessary to encapsulate the thermocouple in a different material from that of the barrier layer.

In an embodiment, the tie layer has a thickness less than or equal to 500 µm, even between 50 and 150 µm.

In a part according to the invention, the insulation layer is chosen with a thickness that is sufficiently reduced to enable the thermocouple to be as close as possible to the substrate, while avoiding direct contact between the thermocouple and the tie layer.

For example, the insulation layer can have a thickness less than or equal to 100 µm, or even between 1.0 µm and 10 µm.

Such a layer as proposed below is sufficiently thick to ensure that any risk of electrical break due to the roughness of the substrate is avoided. Indeed, if the insulation layer is too fine, in particular less than 1.0 µm, it reproduces the roughness of the underlying substrate and, if the roughness is too high, there is a risk of electrical discontinuity of the thermocouple, which would therefore be non-functional.

In an embodiment, the insulation layer has the same composition as the barrier layer. This results in optimum stability of the barrier layer on the insulation layer.

Moreover, the production method is further simplified since it is not necessary to change the method of deposition between the insulation layer and the barrier layer.

In an embodiment, the barrier layer has a thickness between 10 µm and 2.0 mm.

The thickness of the barrier layer is chosen as a function of the properties desired for this layer. For example, if the part is a turbine ring, it may be desired that the barrier layer acts as thermal insulation in addition to acting as an environmental barrier. For this purpose, it is preferable that the barrier layer has a large thickness, for example between 1.0 mm and 2.0 mm.

In another embodiment, for example if the part is a turbomachine blade, for which the only desired function is that of environmental barrier, the thickness can then be between 10 µm and 200 µm.

In an embodiment, the part can further comprise, on the barrier layer, one or more layers chosen from a thermal barrier, an abradable layer and/or a layer resistant to environmental pollutants such as compounds comprising calcium, magnesium, aluminium or silicon in particular the oxides of these compounds (conventionally called CMAS).

Such embodiments make it possible to adapt the parts to particular situations for specific applications encountered in different locations of a turbomachine.

In an embodiment, the part is an aeronautical turbomachine part chosen from: a turbine ring, a blade/vane, a combustion chamber, a high-pressure distributor or a low-pressure distributor.

According to another of its aspects, the invention relates to a method for producing a part described above, the production method comprising the following steps:
  forming a tie layer comprising silicon on at least one surface of a substrate made of ceramic matrix composite material; then
  forming an insulation layer comprising a rare earth disilicate or silica on the tie layer; then
  forming a thermocouple on the insulation layer; then
  forming a barrier layer comprising a rare earth disilicate, on the insulation layer and such that the thermocouple is inserted between the insulation layer and the barrier layer; then
  a step of heat treatment at a temperature between 1000° C. and 1500° C., for a duration of between 5 hours and 50 hours.

Unlike the methods of the prior art, this method makes it possible to obtain a part with the advantages described above.

In particular, the method is simplified since it is not necessary to apply particular care to the encapsulation of the thermocouple, since the insulation layer separates this from the tie layer. Thus, the thermocouple does not risk contact with the tie layer, without however requiring a particular encapsulation treatment. This results in a part that is simpler to produce and for which the thermocouple is formed directly between the substrate and the barrier layer.

The heat treatment, carried out after the steps of forming the insulation layer and the barrier layer, make it possible to ensure excellent stability of the barrier layer.

Moreover, the thermocouple is in direct contact with the bottom of the barrier layer which is the precise location of the part where damaging phenomena are most likely to appear.

In an embodiment, when the insulation layer comprises a rare earth disilicate, the insulation layer can be formed by physical vapour deposition, or by thermal spraying or by liquid deposition then sintering of one or more powders.

In an embodiment, forming the thermocouple can comprise a step of printing the thermocouple on the insulation layer.

For example, this step of printing the thermocouple on the insulation layer can be followed by a step of high-temperature sintering of the ink depositors, in order to remove the organic components of the ink and to sinter together the metallic particles of the ink, and to form the continuous circuit of the thermocouple.

This sintering step is not always necessary, and the final thermocouple can also be obtained by the subsequent heat treatment step at a temperature between 1000° C. and 1500° C. and for a duration of between 5 hours and 50 hours, which will cause the sintering of the particles of the deposited thermocouple, in which case the formation step only comprises the step of printing the thermocouple.

In an embodiment, the step of printing the thermocouple is followed by a drying step carried out between 60° C. and 100° C.

Such a drying step can remove the solvents and immediately stabilise the structure of the printed thermocouple, in order to ensure that this structure does not change until the subsequent heat treatment step at a temperature between 1000° C. and 1500° C. and for a duration of between 5 hours and 50 hours, which will make it possible to obtain the sintering of the particles in order to obtain the final thermocouple.

In an embodiment, forming of the thermocouple comprises a step of depositing a conductive ink by ink jet, aerosol jet printing, screen printing or micro-extrusion.

In an embodiment, the conductive ink is a suspension comprising one or more solvents, one or more organic binders and particles, the particles being chosen from nanoparticles or microparticles of silver (Ag), a copper-nickel-manganese alloy (CuNiMn), platinum (Pt) or a platinum-rhodium alloy (PtRh).

The term nanoparticles is understood to mean particles for which the largest dimension is less than or equal to one hundred nanometres, or even ten nanometres.

The term microparticles is understood to mean particles for which the largest dimension is less than or equal to one hundred micrometres, or even ten micrometres.

In an embodiment, the heat treatment step is carried out at a temperature between 1100° C. and 1150° C. and for a duration of between 5 hours and 10 hours.

In an embodiment, a step of polishing the insulation layer can be carried out after the formation of the insulation layer and before the step of forming the thermocouple.

Such a polishing step can ensure better electrical continuity of the thermocouple during the subsequent formation step. More specifically, if the insulation layer is too rough, and since the thermocouple is formed thereon, the roughness can give rise to electrical discontinuities on the thermocouple which harms its correct operation.

BRIEF DESCRIPTION OF THE FIGURES

FIG. 1 schematically shows a part at various times during its preparation.

FIG. 2 schematically illustrates a method of the invention.

DESCRIPTION OF THE EMBODIMENTS

The invention is now described by means of the figures which illustrate certain particular embodiments and which must not be interpreted as limiting.

FIG. 1 shows a final part 105 and several intermediate states 101, 102, 103, 104 of the final part 105 during its preparation.

At least one face of the substrate 10 is covered by a tie layer 11 comprising silicon. The purpose of the tie layer 11 is to facilitate the subsequent attachment of the insulation layer 12. For example, the tie layer 11 can be a layer comprising only silicon.

The substrate 10 is made of ceramic matrix composite material chosen from silicon carbide based substrates (SIC).

The tie layer 11 is then covered with an insulation layer 12, on an opposite surface to the substrate. The purpose of the insulation layer 12 is to avoid any contact between the tie layer 11 and the thermocouple 13.

More specifically, and as described above, the contact between the tie layer 11 and the thermocouple 13 is undesirable because silicon from the tie layer 11 can react with metal from the thermocouple 13, which would harm the correct operation of the thermocouple 13.

However, the insulation layer 12 has the lowest possible thickness. For example, the thickness of the insulation layer 12 can be less than or equal to 100 µm. More specifically, the smaller the thickness of the insulation layer 12, the more the measurement by the thermocouple 13 is representative of the temperature effectively experienced by the substrate 10.

As described above, the insulation layer 12 comprises either silica or a rare earth disilicate.

In an embodiment the insulation layer 12 consists of silica.

In an alternative embodiment, the insulation layer 12 comprises a rare earth disilicate chosen from ytterbium disilicate and/or yttrium disilicate.

In an embodiment, the insulation layer 12 can have the same composition as the barrier layer 14. In such an embodiment, the continuity between the insulation layer 12 and the barrier layer 14 is excellent, and the production method is further simplified.

As shown in FIG. 1, a thermocouple 13 is then formed on the insulation layer 12. The methods for depositing such a thermocouple 13 will be described below, and in conjunction with the corresponding step from the second figure.

Of course, the thermocouple 13 is formed such that the measurement of the temperature can be accessed from outside the part.

For example, the thermocouple 13 may comprise connection means (not shown in FIG. 1), for example wires, which can connect the thermocouple 13 to outside the part 105. In an embodiment, the wires are formed at the same time as the thermocouple, and can be formed in the same manner.

In an embodiment, in order to obtain such a thermocouple, it is possible to form the thermocouple with wires on the insulation layer 12 and slightly beyond, then to deposit a mask on the end of the wires formed beyond the insulation layer 12 which will be covered by the barrier layer 14, in order to deposit the barrier layer 14 only on the thermocouple 13 but not on the end of the wires, then to remove the cover and thus obtain access to the wires connected to the thermocouple 13.

Of course, the metal or metal alloy composing the thermocouple 13 is chosen so that it can faithfully measure the temperatures of interest in the context of the normal use of the final part 105.

For example, in the case of a turbomachine part, the temperatures measured at the substrate 10, and thus of the thermocouple 13, can be between 1000° C. and 1300° C. It is therefore preferable to choose a thermocouple composed of a copper-nickel-manganese alloy (CuNiMn), platinum (Pt) or a platinum-rhodium alloy (PtRh).

In an embodiment, the insulation layer 12 and the barrier layer 14 are electrically insulating. This embodiment is advantageous because it is not then necessary to pay particular attention to the insulation of the thermocouple 13 or of any wires enabling it to be connected to an instrumentation, because the thermocouple is sandwiched between two insulating layers. This results in a more reliable part because the risk of a contact between the bare wires is reduced.

Once the thermocouple 13 is formed on the insulation layer 12, a barrier layer 14 is deposited on the surface of the insulation layer 12. The thermocouple 13 is inserted between the insulation layer 12 and the barrier layer 14.

As described above, the barrier layer 14 makes it possible to insulate the substrate 10 from the environment to which the part is exposed.

As indicated, the barrier layer 14 comprises a rare earth disilicate. The rare earth disilicate is preferably chosen from ytterbium disilicate and/or yttrium disilicate. More specifically, it is observed that these two rare earths, alone or in combination, make it possible to obtain the best compromise between cost and the desired performance for the barrier layer 14.

The barrier layer 14 can, for example, have a thermally insulating or environmentally insulating function, in other words providing a seal against conventionally encountered environmental pollutants such as compounds comprising calcium, magnesium, aluminium or silicon, in particular oxides of these compounds (conventionally called CMAS).

In an embodiment, the barrier layer 14 can be covered with an additional barrier, not shown in FIG. 1, able to fulfil an additional function to that already fulfilled by the barrier layer 14.

In an embodiment, the thermocouple is in direct contact with the insulation layer 12, and in direct contact with the barrier layer 14.

The thickness of the barrier layer 14 is chosen to represent a compromise between the weight, cost and desired specifications for the final part 105.

As described in FIG. 1, in the final part 105, the thermocouple 13 is located inserted between the insulation layer and the barrier layer. The thermocouple 13 inserted between the insulation layer and the barrier layer makes it possible to obtain a reliable measurement of the temperature effectively experienced in the final part 105 between the substrate 10 and the barrier layer 14.

In an embodiment, the part comprises no layers other than the substrate 10, the tie layer 11, the insulation layer 12 and the barrier layer 14. Of course, the part comprises a thermocouple 13 inserted between the insulation layer 12 and the barrier layer 14.

FIG. 2 schematically shows the various steps E1 to E7 of a method for preparing a final part 105, as described above, starting from a substrate 10 constituting an initial part 101. The steps represented by the dashed boxes of FIG. 2 are optional.

The preparation method shown comprises a first step E1 of preparing a tie layer 11 at the surface of a substrate 10.

For example, the tie layer 11 can be formed in a manner that is known per se, for example by thermal spraying, PVD or CVD on at least one surface of a substrate 10.

This first step E1 makes it possible to obtain an intermediate part 102, wherein the substrate 10 is covered on at least one surface by the tie layer 11.

The method then comprises a step E2 of forming an insulation layer 12. This step E2 makes it possible to obtain the intermediate part 103, wherein an insulation layer 12 has been formed at the surface of the tie layer 11.

In the embodiments where the insulation layer comprises a rare earth disilicate, step E2 of forming the insulation layer 12 can be carried out by thermal spraying, physical vapour deposition or chemical vapour deposition, or by liquid deposition then sintering of one or more powders.

The method can optionally further comprise a step E3 of polishing the insulation layer 12.

Such a polishing step can be carried out by mechanical polishing or chemical polishing.

This step makes it possible to achieve a better attachment of the thermocouple 13 and reduces the risk of electrical discontinuity in the thermocouple 13.

The method then comprises a step E4 of forming a thermocouple 13 on the insulation layer 12, in order to form the intermediate part 104.

For example, the thermocouple 13 can be formed directly on the insulation layer 12 by means of a conductive ink.

For example, the conductive ink can comprise a plurality of metallic particles dissolved in a solvent, as previously described.

For example, the formation can comprise depositing a conductive ink by ink jet, aerosol jet printing, screen printing or micro-extrusion.

Alternatively, the thermocouple can be deposited by air plasma spraying (APS), high velocity oxy-fuel (HVOF), solution plasma spraying, cold spraying, electron beam physical vapour deposition (EBPVD), chemical vapour deposition (CVD), pulsed laser, plasma or screen printing.

As described above, step E4 of forming the thermocouple 13 can comprise the depositing of an ink, immediately followed by its sintering in order to form the thermocouple.

Alternatively, step E4 of forming the thermocouple can comprise depositing of an ink, optionally followed by its drying.

If step E4 of forming the thermocouple comprises a printing step which is not followed by a sintering step, then the heat treatment step E7 can enable the sintering of the particles comprised in the ink in order to form the final thermocouple.

The method then comprises a step E6 of depositing a barrier layer 14 comprising a rare earth disilicate on the insulation layer 12 and such that the thermocouple 13 is inserted between the insulation layer 12 and the barrier layer 14.

The method presented in FIG. 2 then comprises a heat treatment step E7. This heat treatment step E7 can stabilise the barrier layer 14, and optionally the insulation layer 12. Such a step E7 also makes it possible, in certain embodiments, to finalise the sintering of the thermocouple 13.

The expression "between . . . and . . . " should be understood as including the limits.

The invention claimed is:

1. A part comprising a substrate made of ceramic matrix composite material, said substrate being coated with a multilayer stack comprising, in this order, starting from the substrate:
    a tie layer comprising silicon;
    an insulation layer comprising a rare earth disilicate or silica;
    a barrier layer comprising a rare earth disilicate;
    the part further comprising at least one thermocouple inserted between the insulation layer and the barrier layer.

2. The part according to claim 1, wherein the insulation layer has a thickness less than or equal to 100 μm.

3. The part according to claim 1, wherein the barrier layer has a thickness between 10 μm and 2.0 mm.

4. The part according to claim 1, further comprising, on the barrier layer, one or more layers chosen from a thermal barrier, an abradable layer and/or a layer resistant to compounds comprising calcium, magnesium, aluminium and/or silicon and/or oxides of these compounds (CMAS).

5. The part according to claim 1, wherein the part is an aeronautical turbomachine part chosen from: a turbine ring, a blade/vane, a combustion chamber, a high-pressure distributor or a low-pressure distributor.

6. A method for producing the part according to claim 1, the production method comprising:
    forming the tie layer comprising silicon on at least one surface of the substrate made of ceramic matrix composite material; then
    forming the insulation layer comprising the rare earth disilicate or silica on the tie layer; then
    forming the thermocouple on the insulation layer; then
    forming the barrier layer comprising the rare earth disilicate on the insulation layer, and such that the thermocouple is inserted between the insulation layer and the barrier layer; then
    a step of heat treatment at a temperature between 1000° C. and 1500° C., for a duration of between 5 hours and 50 hours.

7. The production method according to claim 6, wherein forming the thermocouple comprises a step of depositing a conductive ink by ink jet, aerosol jet printing, screen printing, micro-extrusion or laser deposition.

8. The production method according to claim 7, wherein the conductive ink is a suspension comprising one or more solvents, one or more organic binders and particles, the particles being chosen from nanoparticles or microparticles of silver (Ag), a copper-nickel-manganese alloy (CuNiMn), platinum (Pt) or a platinum-rhodium alloy (PtRh).

9. The production method according to claim 7, wherein forming the thermocouple comprises a step of printing the thermocouple on the insulation layer and a step of high-temperature sintering of the deposited ink in order to remove the organic components of the ink and to sinter together the metallic particles of the ink and to form the continuous circuit of the thermocouple.

10. The production method according to claim 6, wherein the heat treatment step is carried out at a temperature between 1100° C. and 1150° C., for a duration of between 5 hours and 10 hours.

* * * * *